(12) United States Patent
Miki

(10) Patent No.: US 9,851,023 B2
(45) Date of Patent: Dec. 26, 2017

(54) PIPE SUPPORT STRUCTURE

(71) Applicant: Hironori Miki, Toyota (JP)

(72) Inventor: Hironori Miki, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 335 days.

(21) Appl. No.: 14/513,786

(22) Filed: Oct. 14, 2014

(65) Prior Publication Data

US 2015/0026956 A1 Jan. 29, 2015

Related U.S. Application Data

(63) Continuation of application No. 13/392,203, filed as application No. PCT/JP2011/004612 on Aug. 18, 2011, now abandoned.

(30) Foreign Application Priority Data

Oct. 1, 2010 (JP) .................. 2010-223997

(51) Int. Cl.
| | |
|---|---|
| G01F 1/84 | (2006.01) |
| F16L 3/16 | (2006.01) |
| F16L 55/035 | (2006.01) |
| F16L 11/08 | (2006.01) |
| F16D 48/02 | (2006.01) |

(52) U.S. Cl.
CPC ............. *F16L 3/16* (2013.01); *F16L 11/08* (2013.01); *F16L 55/035* (2013.01); *F16D 2048/0224* (2013.01); *Y10T 29/49959* (2015.01)

(58) Field of Classification Search
CPC . F16L 3/16; F16L 11/08; F16L 55/035; F16D 2048/0224; Y10T 29/49959

USPC .................. 73/861, 355, 356, 357
See application file for complete search history.

(56) References Cited

U.S. PATENT DOCUMENTS

| | | | |
|---|---|---|---|
| 5,546,814 A | 8/1996 | Matter et al. | |
| 5,700,957 A | 12/1997 | Alesz et al. | |
| 6,189,551 B1 * | 2/2001 | Sargeant ............ | A47L 15/0021 134/200 |
| 7,258,025 B2 | 8/2007 | Doihara et al. | |
| 7,628,084 B2 | 12/2009 | Schlosser et al. | |
| 7,971,494 B2 | 7/2011 | Hussain et al. | |

(Continued)

FOREIGN PATENT DOCUMENTS

| | | |
|---|---|---|
| JP | Y2-62-38004 | 9/1987 |
| JP | A-5-26291 | 2/1993 |

(Continued)

OTHER PUBLICATIONS

International Search Report issued in International Patent Application No. PCT/JP2011/004612 dated Sep. 20, 2009 (with translation).

(Continued)

*Primary Examiner* — Gwendolyn Baxter
(74) *Attorney, Agent, or Firm* — Oliff PLC

(57) ABSTRACT

A pipe support structure which is constructed to utilize the Coriolis force and the reaction force caused, thereby making it possible to suppress the hose compliance amount in the high temperature area while maintaining the degree of freedom of mountability specific for the resin pipe and to realize the above suppressing effect by the simple construction and at a low cost.

4 Claims, 15 Drawing Sheets

(56) References Cited

U.S. PATENT DOCUMENTS

2006/0131884 A1 6/2006 Inoue et al.
2011/0031052 A1 2/2011 Inoue et al.

FOREIGN PATENT DOCUMENTS

| JP | A-2001-295961 | 10/2001 |
|---|---|---|
| JP | A-2004-125021 | 4/2004 |
| JP | A-2006-194433 | 7/2006 |
| JP | A-2010-151228 | 7/2010 |

OTHER PUBLICATIONS

Nov. 13, 2013 Office Action issued in U.S. Appl. No. 13/392,203.
Mar. 6, 2014 Office Action issued in U.S. Appl. No. 13/392,203.
Jul. 14, 2014 Office Action issued in U.S. Appl. No. 13/392,203.

* cited by examiner

Hose Compliance Amounts Different in Temperature

Hose Compliance Amounts Different in Temperature

US 9,851,023 B2

PIPE SUPPORT STRUCTURE

This is a Continuation of application Ser. No. 13/392,203 filed Feb. 24, 2012, which is a National Stage of Application No. PCT/JP2011/004612 filed Aug. 18, 2011 which claims priority to Japanese Patent Application No. 2010-223997 filed Oct. 1, 2010. The prior applications, including the specifications, drawings and abstract are incorporated herein by reference in their entirety.

FIELD OF INVENTION

The present invention relates to a pipe support structure, and more particularly to a pipe support structure for allowing a high temperature fluid to pass therethrough.

BACKGROUND OF INVENTION

In general, a hydraulic machine such as an actuator and the like to be hydraulically driven and controlled is supplied with working oil through pipes. The actuator of this type to be hydraulically driven and controlled is for example mounted on a vehicle like an automotive vehicle, and thus utilized for controlling a wide variety of drive units provided on the vehicle.

As an apparatus for braking a vehicle provided with a hydraulic machine such as an actuator and the like, there has so far been known a brake system which comprises a master cylinder to be operated by a brake booster, a hydraulic unit intervening between a master cylinder and a wheel cylinder to control hydraulic pressure applied to the master cylinder, and a pipe for connecting the master cylinder with the hydraulic unit (for example see Patent Document 1).

In the brake system disclosed in the Patent Document 1, the pipe connecting for connecting the master cylinder with the hydraulic unit is constituted by a metal pipe, and a flexible hose made of a resin hose formed at the intermediate portion of the metal pipe and having an outer peripheral surface covered with a meshed metal wire. The flexible hose low in rigidity as compared with the metal pipe makes it possible for the shape of the pipe to finely be adjusted for the relative positional errors between the master cylinder and the hydraulic unit in assembling these parts. Further, the flexible hose can absorb vibrations to be transmitted from the hydraulic unit to the master cylinder.

There are some pipes which are to be used for the hydraulic system having the above brake system and the like, and are each constructed only by a resin pipe in consideration of the degree of freedom for the pipe to be mounted on the vehicle. One of the resin pipes to be used in the hydraulic system is shown for example in FIG. 13. The hydraulic system 100 shown in FIG. 13 comprises a resin pipe 103 incorporated therein. The resin pipe 103 intervenes between a hydraulic power unit 101 and a gear shift actuator 102, and is bent at a predetermined radius of curvature. The resin pipe 103 is clamped with and supported by a support member 105 at a desired position between the hydraulic power unit 101 and the gear shift actuator 102. The working oil outputted from the hydraulic power unit 101 is fed to the gear shift actuator 102 through a resin pipe 103.

The resin pipe 103 of this kind as shown in FIG. 13 is bent at the predetermined radius of curvature, and inclined toward a bent portion 103a from the hydraulic power unit 101 at a predetermined angle with respect to a horizontal plane, so that the resin pipe 103 is apt to vibrate up and down in response to the varied flowing motion of the working oil when the working oil passes through the resin pipe 103. At this time, the flowing motion of the working oil in the resin pipe 103 vibrating in this way causes what is called a Coriolis force F ($F=2m\omega V$, m: fluid mass, $\omega$: fluid angular speed, V: fluid speed in the pipe) which acts in a direction perpendicular to the flowing direction of the working oil in the resin pipe 103. On the other hand, the resin pipe 103 is subject to a reaction force F' against the Coriolis force F(N) from the support member 105. It is further known that the previously mentioned Coriolis force F is, as shown in FIG. 14, increased as the flow rate (ml/s) of the working oil flowing in the resin pipe 103 is increased, or otherwise the temperature (° C.) of the working oil is raised.

The Coriolis force F and the reaction force F' acting on the resin pipe 103 are varied as the time elapses as clear from FIG. 15. The Coriolis force F and the reaction force F' are, however, not equal to each other in magnitude although these forces are opposite in composition to each other. This means that in response to the time elapsed, the magnitude of the Coriolis force F exceeds the magnitude of the reaction force F', or inversely the magnitude of the reaction force F' exceeds the magnitude of the Coriolis force F. Here, for example, when the magnitude of the Coriolis force F exceeds the magnitude of the reaction force F', the resin pipe 103 is brought into the state in which the resin pipe 103 is crushed. At this time, the working oil in the resin pipe 103 comes to be large in flow speed, while the hydraulic pressure of the working oil becomes more than the set value. It is thus to be noted that the resin pipe 103 shown in FIG. 13 designed without consideration of the balance between the Coriolis force F and the reaction force F' results in one of the reasons for the hydraulic pressure to be prevented from being fed in a stable state.

On the other hand, the resin pipe 103 utilized in the hydraulic system 100 imparts the effects to the positional control and the responsive property of the hydraulic machine such as the gear shift actuator and the like irrespective of the resin pipe being wholly or partly made of resin when the rigidity of the pipe is varied in response to the temperature variation of the working oil passing through the resin pipe. For example, if the temperature of the working oil passing through the resin pipe 103 is raised, the rigidity of the resin pipe 103 tends to be decreased, thereby leading to the fact that the expansion amount of the resin pipe 103 what is called a hose compliance amount is increased. This results in the fact that the hydraulic pressure in the resin pipe 103 is decreased, thereby causing such a problem that the hydraulic machine such as the gear shift actuator 102 and the like among other things deteriorates in responsive property.

The rigidity variation of the resin pipe 103 stemming from the temperature variation of the working oil thus caused necessitates such a construction to make variable the control target value of the hydraulic machine such as the gear shift actuator and the like, which comes to be one of the causes to complex the control of the hydraulic pressure. Further, the abruptly lowering in rigidity of the resin pipe 103 possibly gives rise to vibrations in the hydraulic pressure.

It is therefore appreciated that the resin pipe 103 is therefore required to be subject to an appropriate hose compliance amount control.

The methods so far proposed to carry out the appropriate hose compliance amount control for the resin pipe include a method of introducing to the hydraulic system sensors, coolants, heat insulators, and an ECU (Electronic Control Unit) for executing a temperature environment control to perform the hose compliance amount control in the hard and soft aspects, and an additional method of using a metal pipe in lieu of the resin pipe or otherwise adding a metal blade or metal blades to the resin pipe.

PRIOR ART DOCUMENTS

Patent Documents

Patent Document 1: Patent Publication No. 2004-125021

SUMMARY OF INVENTION

Problems to be Solved by Invention

However, the resin pipe 103 shown in FIG. 13 encounters such a problem that there is no appropriate measure to be taken for balancing the Coriolis force F and the reaction force F' caused on the resin pipe 103.

For the measure to the rigidity variation of the resin pipe 103 stemming from the temperature variation of the working oil is raised a method of executing the control of the hose compliance amount from the hard and soft aspects conventionally proposed. This method encounters such a problem that the hydraulic system itself is increased in size, deteriorated in mountability, and increased in cost due to the complexity in construction thereof.

Further, the metal pipe utilized in place of the resin pipe 103 also encounters such a problem that the metal pipe loses a degree of freedom in mountability of the pipe. In addition, for example, when the resin pipe 103 is subject to the load caused by an acceleration speed G, and when the position of the resin pipe is adjusted in response to the assembling errors of the hydraulic power unit 101 and the gear shift actuator 102, the resin pipe 103 cannot absorb the load, thereby causing such a problem that the support member is subject to the excessive load.

Further, the resin pipe 103 used together with the metal blades encounters such a problem that the resin pipe 103 and the metal blades cannot fully suppress the hose compliance amount from being increased in response to the temperature raising of the working oil.

The present invention is made for solving the conventional problem previously mentioned, and has an object to provide a pipe support structure which can be realized with a simple construction and a low cost for suppressing the hose compliance amount in a high temperature area while maintaining the degree of freedom in mountability inherent to the resin pipe by utilizing the Coriolis force and the reaction force caused on the pipe.

Means for Solving Problems

For achieving the previously mentioned object, the pipe support structure according to the present invention for supporting a pipe supported at a first clamp position and a second clamp position, the pipe having a fluid passage formed therein to allow a fluid at a high temperature to pass therethrough, and made of a resilient material, comprises: a retaining member for resiliently retaining the outer peripheral portion at least one of the first clamp position and the second clamp position, the pipe having an inclined portion inclined with respect to a horizontal plane perpendicular to the gravity direction, and a bent portion having a predetermined radius of curvature, the inclined portion and the bent portion being disposed between the first clamp position and the second clamp position, the retaining member having a predetermined spring constant and a predetermined attenuation coefficient, the pipe being subjected to a Coriolis force and having a heat expansion amount caused by the Coriolis force when the fluid passage allows the fluid at the high temperature, the retaining member having a reaction force acting against the Coriolis force, at least one of the first clamp position and the second clamp position and the shape of the bent portion being set, and the spring constant and the attenuation coefficient of the retaining member being set in such a manner that the reaction force of the retaining member generated in response to the Coriolis force generated on the pipe acts to suppress the heat expansion amount caused by the Coriolis force from being increased when the fluid passage allows the fluid at the high temperature.

By the construction of the pipe support structure as set forth in the above, at least one of the first clamp position and the second clamp position and the shape of the bent portion is set, and the spring constant and the attenuation coefficient are set being set in such a manner that the reaction force of the retaining member generated in response to the Coriolis force generated on the pipe acts to suppress the heat expansion amount caused by the Coriolis force from being increased when the fluid passage allows the fluid at the high temperature. This results in the fact that the pipe support structure according to the present invention can utilize the Coriolis force caused on the pipe and the reaction force caused on the retaining member. This makes it possible for the pipe support structure according to the present invention to suppress the hose compliance amount in the high temperature area, viz., the expansion amount of the master hose from being increased while maintaining the mountability of the degree of freedom especially for the master hose made of a resilient material such as for example resins and the like. The pipe support structure according to the present embodiment can be realized with the construction simple and at a lost cost.

In the pipe support structure as set forth in the above, when the Coriolis force is represented by $F_c$, the fluid angular speed of the fluid passing through the fluid passage is represented by $\omega$, and the time is represented by t, the Coriolis coercive force $f_c$ temporally varying in response to the vibration of the pipe is given by $f_c(t)=F_c \sin \omega t$, when the reaction force caused on the retaining member against the Coriolis force $F_c$ is represented by $F_r$, and the clamp reaction force caused on the retaining member and temporally varying in response to the Coriolis coercive force $f_c(t)$ is represented by $f_r(t)$, the clamp reaction force $f_r(t)$ is given by $f_r(t)=Fr \sin(\omega t-\phi)$, when the coefficient to be determined in response to the ratio of the clamp reaction force $f_r(t)$ with respect to the Coriolis coercive force $f_c(t)$ is "k", the first clamp position, the second clamp position, the shape of the bent portion, the spring constant, and the attenuation coefficient are set to have the coefficient "k" in the following equation (1) approach the number of 1.

$$f_c(t)=-kf_r(t) \qquad (1)$$

By the construction of the pipe support structure as set forth in the above, the pipe support structure according to the present invention is constructed to have the first and second clamp positions, the shape of the bent portion, and the spring constant and the attenuation coefficient of the retaining member set to approximate the coefficient "k" in the equation (1) to "1", so that the Coriolis coercive force $f_c(t)$ and the clamp reaction force "$f_r$"(t) act to cancel each other. For this reason, the clamp reaction force "$f_r$"(t) can be converted to the pressing load to the pipe, thereby making it possible to suppress the expansion amount of the pipe from being increased.

In the pipe support structure as set forth in the above, when the fluid mass of the fluid passing through the fluid passage between the first clamp position and the second clamp position is represented by "m", and the fluid speed passing through the fluid passage is represented by "V", the Coriolis force is given by the following equation (2), $$F_c = 2m\omega V \tag{2}$$

when the fluid density of the fluid is represented by "ρ", the fluid speed passing through the fluid passage between the first clamp position and the second clamp position is represented by "v", and the radius of curvature of the bent portion is represented by "r", the fluid mass "m" and the fluid angular speed ω in the above equation (2) are given by the following equations (3) and (4), respectively, $$m = \rho \cdot v \tag{3}$$

$$\omega = \frac{V}{r} \tag{4}$$

at least one of the first clamp position and the second clamp portion is adjusted, and the fluid mass "m" indicated in the above equation (3) is adjusted to adjust the Coriolis force $F_c$ indicative of the amplitude of vibration in the above Coriolis coercive force $f_c(t)$, and the radius of curvature "r" of the bent portion is adjusted to adjust the fluid angular speed ω.

By the construction of the pipe support structure as set forth in the above, the pipe support structure according to the present invention is constructed to have at least any one of the first and second clamp positions adjusted, thereby adjusting the fluid mass (m) represented by the equation (3). This makes it possible to adjust the Coriolis force $F_c(t)$, i.e., an amplitude of the Coriolis coercive force $f_c(t)$. Further, the pipe support structure according to the present embodiment can adjust fluid angular speed ω(rad/s) represented by the above equation (4) by adjusting the radius of curvature "r"(m) of the bent portion.

It will be appreciated from the foregoing description that the pipe support structure according to the present invention can adjust the Coriolis coercive force $f_c(t)$ only by adjusting the first and second clamp positions, and the radius of curvature of the bent portion.

In the pipe support structure as set forth in the above, when the inherent vibration number of the retaining member is represented by $\omega_n$, the damping ratio is represented by ζ, and the spring constant is represented by "k", the reaction force $F_r$ and the phase difference φ indicative of the amplitude in the clamp reaction force $f_r(t)$ are given by the following equations (5) and (6), $$F_r = \frac{F_c/k}{\sqrt{\left\{1 - \left(\frac{\omega}{\omega_n}\right)^2\right\}^2 + \left(2\zeta\frac{\omega}{\omega_n}\right)^2}} \tag{5}$$

$$\phi = \tan^{-1}\left\{\frac{2\zeta\frac{\omega}{\omega_n}}{1 - \left(\frac{\omega}{\omega_n}\right)^2}\right\} \tag{6}$$

when the attenuation coefficient is represented by "h", and a total mass totaling the fluid mass of the whole fluid passage and the mass of the pipe is represented by "M", the inherent angular vibration number $\omega_n$ and the damping ratio ζ in the above equations (5) and (6) are given by the following equations (7) and (8), respectively, $$\omega_n = \sqrt{\frac{k}{M}} \tag{7}$$

$$\zeta = \frac{h}{2\sqrt{Mk}} \tag{8}$$

the spring constant "k" and the attenuation coefficient "h" are adjusted to adjust the phase difference φ and the reaction force $F_r$.

By the construction of the pipe support structure as set forth in the above, the pipe support structure according to the present invention is constructed to have the phase difference φ and the reaction force $F_r$ by adjusting the spring constant "k" and the attenuation coefficient "h". For this reason, the pipe support structure according to the present invention can adjust the clamp reaction force "$f_r$"(t) in response to the Coriolis coercive force $f_c$(t) only by suitably selecting the optimum spring constant "k" and the optimum attenuation coefficient "h" from among the retaining member respectively having the spring constants "k" and the attenuation coefficients "h" different from one another.

Effects of Invention

The pipe structure according to the present invention can be realized with a simple construction and a low cost for suppressing the hose compliance amount from being increased in a high temperature area while maintaining the degree of freedom in mountability inherent to the resin pipe by utilizing the Coriolis force and the reaction force caused on the pipe.

EMBODIMENT FOR PERFORMING INVENTION

The embodiment of the present invention will be explained hereinafter with reference to the accompanying drawings.

Figure 1:
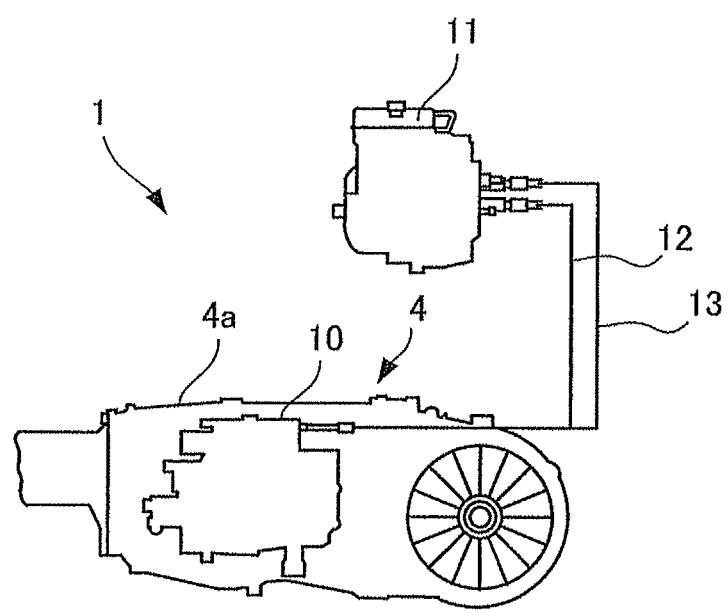
FIG. 1 is an outlined construction view schematically showing a construction of a vehicle to which the pipe support structure according to the embodiment of the present invention is applied.

Referring to FIG. 1, explanation will be made about a vehicle 1 to which the pipe support structure according to the present embodiment of the present invention is applied. Firstly, the construction of this embodiment will be explained.

As shown in FIG. 1, the vehicle 1 is constructed to include an engine not shown serving as a drive source, a clutch mechanism also not shown, and an AMT (Automated Manual Transmission) 4. The clutch mechanism and the AMT 4 are drivably connected with each other by torque tube also not shown.

The engine is constructed by a known drive unit which is adapted to output a drive force by burning a mixture of air and fuel including gasoline, light oil and other hydrocarbon fuels in combustion chambers each formed by a cylinder not shown. The engine is constructed to be operated by repeatedly performing a series of steps including an intake stroke, a compression stroke, a combustion stroke, and an exhaust stroke, so that the pistons are reciprocated in the cylinders, respectively, to rotate a crank shaft not shown which is drivably connected with the pistons of the cylinders.

The clutch mechanism is provided between the engine and the AMT 4. The clutch mechanism has a clutch actuator not shown, a fly wheel drivably connected with the crank shaft of the engine, and a clutch disc driven to rotate in synchronism with the input shaft of the AMT 4 rotatably supported on a torque tube. The clutch mechanism is operative to have the clutch actuator selectively engage or disengage the fly wheel and the clutch disc to take a power transmission state in which the rotation of the engine is transmitted to the AMT 4 or a power interception state in which the rotation of the engine is not transmitted to the AMT 4. The clutch actuator is connected by a pipe not shown with a HPU 11 which will become apparent as the description proceeds hereinafter, so that the fly wheel and the clutch disc are selectively engaged with or released from each other in response to the varied hydraulic pressure supplied from the HPU 11.

The AMT 4 is constructed to include a transaxle case 4a, a gear unit, a gear shift actuator (hereinafter simply referred to as "GSA") 10, a hydraulic power unit (hereinafter simply referred to as "HPU2") 11. The gear unit is constructed to form for example first to sixth gear stages in the forward travel state of the vehicle. The gear unit is accommodated in the transaxle case 4a. The number of the gear stages to be formed in the gear unit is not limited to the first to sixth gear stages according to the present invention.

The AMT 4 is operative to have the shift operation of shifting the stages not manually operated but automatically operated with the use of the GSA 10, and is constructed to automatically change speed and output the rotation inputted from the clutch mechanism. The vehicle 1 according to the present embodiment is constructed to have the clutch mechanism automatically perform the operation of selectively transmitting or not transmitting the power in unison with the automatic change speed operation of the AMT 4.

The gear unit is provided with a counter shaft not shown to be rotated in synchronism with the input shaft of the AMT 4, an output shaft, and a plurality of gears rotatably supported on the output shaft. The gears on the output shaft are always held in mesh with a plurality of gears, respectively, on the counter shaft, so that the gears on the counter shaft can be rotated in synchronism with the input shaft of AMT 4 at a rotation number varied in response to the gear ratio established on each of the gear trains. Any one gear selected from among the gears in the gear unit is synchronized with the output shaft by a synchromesh mechanism not shown to enable the speed change ratio of the gear unit to be set at the speed change ratio as requested by a driver.

The GSA 10 is connected with the HPU 11 through a master hose 12 and a return hose 13 both of which serve as pipes, respectively, so that the select shaft and the folk shaft not shown can be operated in response to the hydraulic pressure supplied to the HPU 11.

The AMT 4 is operative with the operation of the select shaft to select the gears to be synchronized by the synchromesh mechanism, viz., the gears responsive to the speed change ratio as requested by the driver. The AMT 4 is further operative with the operation of the folk shaft to have the sleeve not shown of the synchromesh mechanism axially moved, and thus to have the gears responsive to the speed change ratio as requested by the driver brought into synchronism with the output shaft. With these steps, the speed change operation is finished in the gear unit.

The HPU 11 is adapted to suck the working oil serving as a fluid stored in a reservoir tank not shown and to adjust the sucked working oil before supplying the working oil to the clutch actuator and the GSA 10, respectively.

The HPU 11 is electrically connected with an electronic control unit (hereinafter simply referred to as "ECU") not shown, and is provided with solenoids such as a master solenoid, a clutch solenoid, a shift solenoid, a select solenoid and the like, and devices such as an accumulator and the like to be controlled in accordance with the control signals transmitted from the ECU. The HPU 11 is operative to have the solenoids and the devices controlled in accordance with the control signals transmitted from the ECU, so that the adjusted working oil is supplied to the clutch actuator and the GSA 10 for the operations of these the actuators.

The ECU is constructed to comprise a micro-computer containing therein for example a CPU, a RAM, a ROM, an input-output interface and the like. The CPU is adapted to utilize a temporally memorizing function of the RAM, and to perform a signal process in accordance with the program preliminarily memorized in the ROM.

The following explanation will be directed to the master hose 12 and the return hose 13 with reference to FIGS. 2 to 5.

Figure 2:
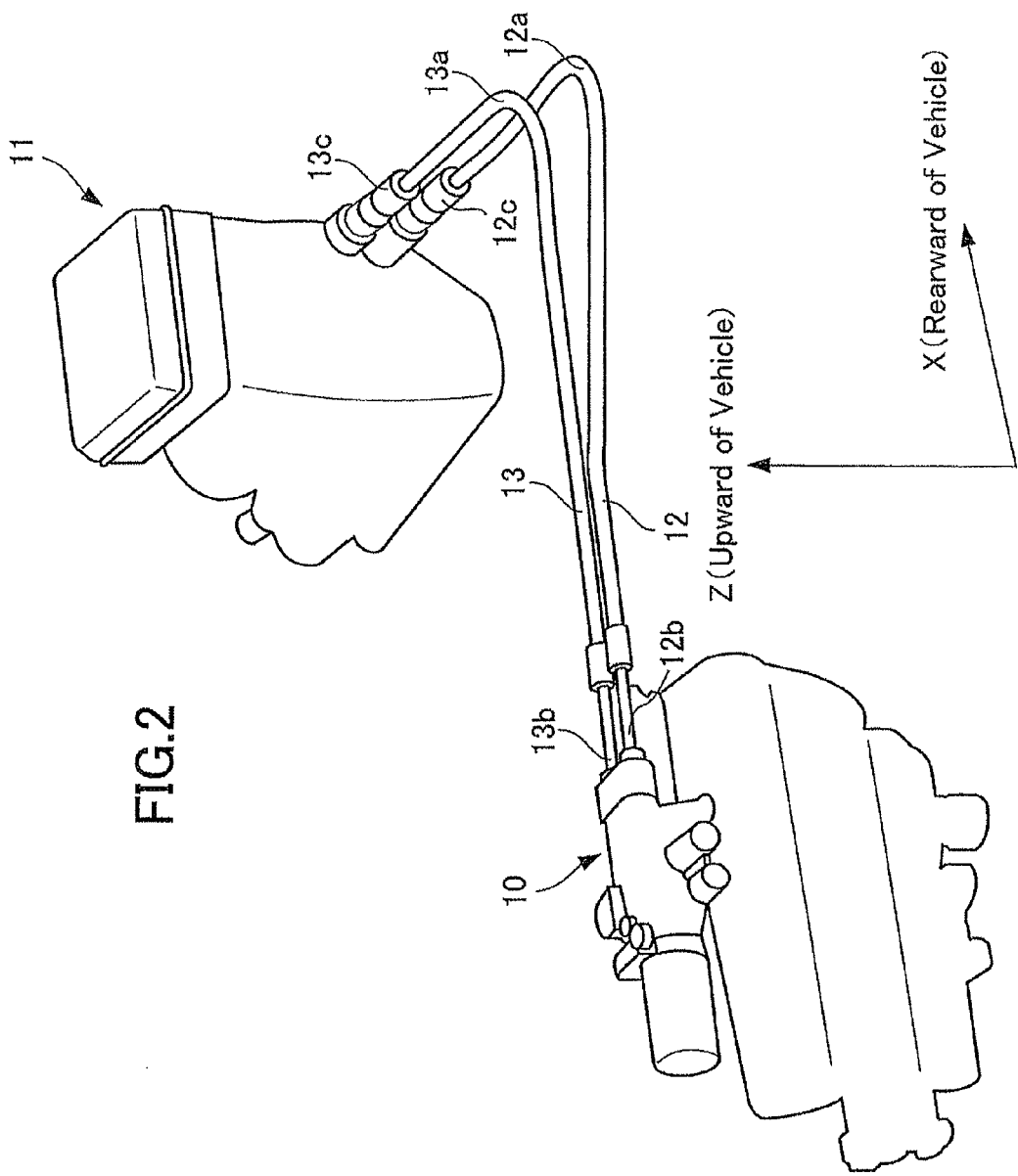
FIG. 2 is a perspective view showing a connected state in which a master hose and a return hose each forming part of the embodiment of the present invention are connected with each other.

As shown in FIG. 2, the master hose 12 and the return hose 13 are made of resin, and are connected with the GSA 10 and the HPU 11 in the state of having respective bent portions 12a, 13a bent and positioned in the rear side of the vehicle. The master hose 12 is formed therein with a fluid passage 12e (see FIG. 7). The return hose 13 is formed therein with a fluid passage in a similar manner to the master hose 12. The passage 12e (see FIG. 7) of the master hose 12 and the passage of the return hose 13 are adapted to allow the working oil to pass therethrough for operating the GSA 10.

The following explanation will be made with the end portions of the master hose 12 and the return hose 13 secured to the GSA 10 being hereinafter referred to as "GSA side secured end portions 12b, 13b", respectively, while the end portions of the master hose 12 and the return hose 13 secured to the HPU 11 being hereinafter referred as "HPU side secured end portions 12c, 13c", respectively.

Figure 3:
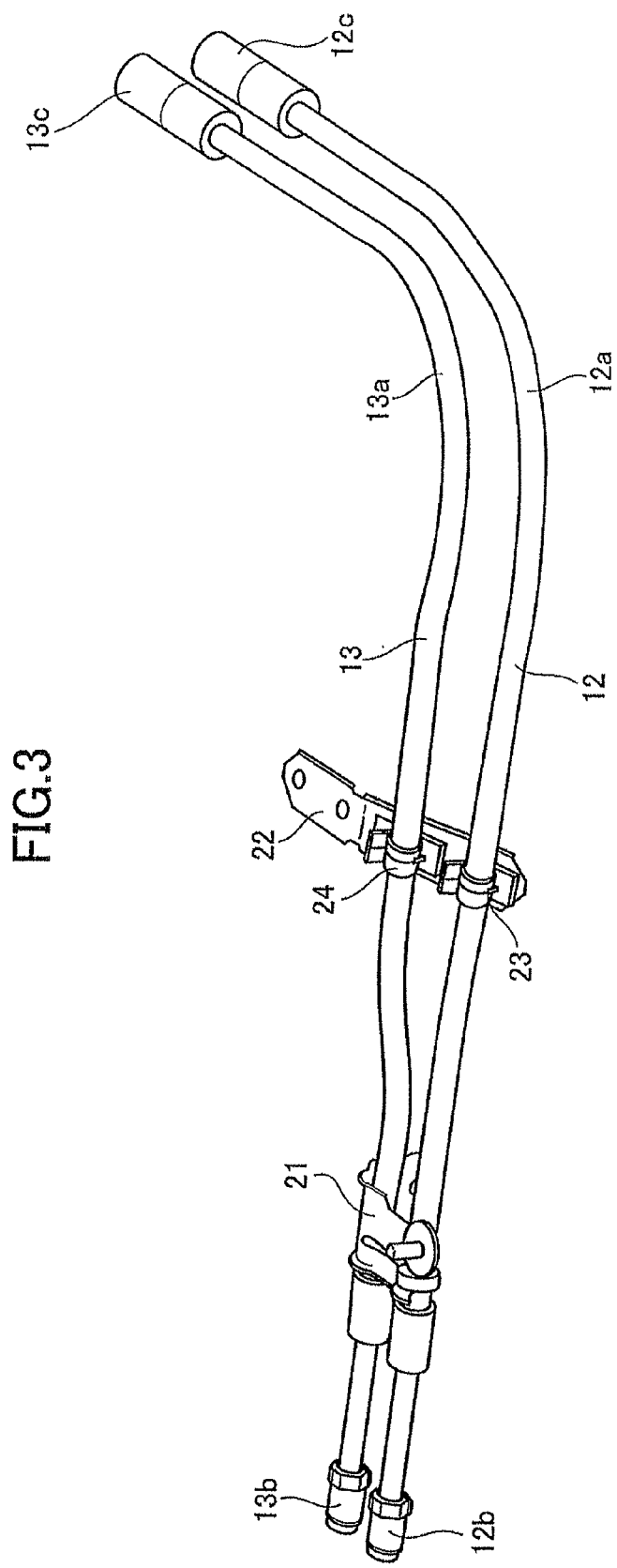
FIG. 3 is a perspective view showing the pipe support structure according to the embodiment of the present invention.

As shown in FIG. 3, the master hose 12 and the return hose 13 are clamped to the transaxle case 4a (see FIG. 1) through a first support member 21 and a second support member 22.

The first support member 21 is secured to the transaxle case 4a (see FIG. 1) at a position spaced apart by a predetermined distance from the GSA side secured end portions 12b, 13b toward the HPU side secured end portions 12c, 13c. The first support member 21 is made of a metal material including a steel material such as, for example, SPC and the like, and has a pair of grommets not shown mounted thereon, one of the grommets being interposed between the master hose 12 and the first support member 21 while the other of the grommets being interposed between the return hose 13 and the first support member 21. The grommet 25 is made of a resilient material such as, for example, chloroprene rubber (CR), Chlorosulfonated polyethylene rubber (CSM) and the like. The grommet may be made of plastic materials other than the rubber-like resilient materials.

The second support member 22 has a master side clamp portion 23 for clamping the master hose 12, and a return side clamp portion 24. The second support member 22 is secured to the transaxle case 4a (see FIG. 1) at a position spaced apart by a predetermined distance from the first support member 21 toward the HPU side secured end portions 12c, 13c. The second support member 22 is made of a metal material including a steel material for example as SPC and the like similarly to the first support member 21.

The second support member 22 has a master side clamp portion 23 for clamping the master hose 12, and a return side clamp portion 24. These clamp portions are the same in construction, and therefore the following explanation will be made raising as an example the master side clamp portion 23.

Figure 4:
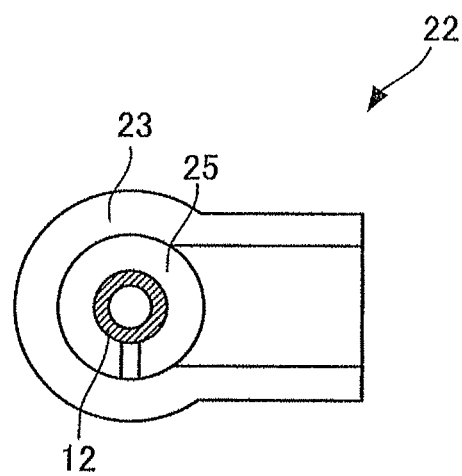
FIG. 4 is a front elevational view of a master side clamp portion forming part of the embodiment of the present invention.
Figure 5:
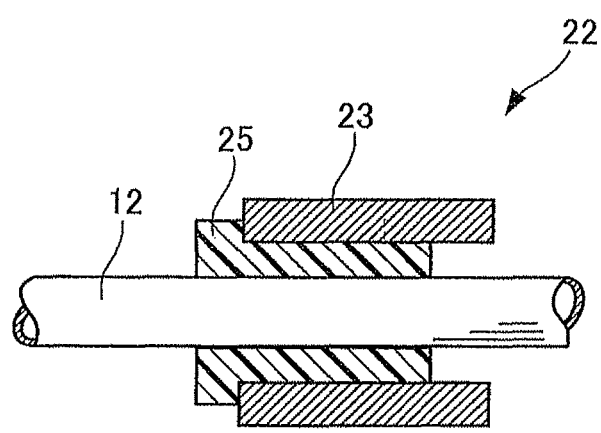
FIG. 5 is a cross-sectional view of the master side clamp portion forming part of the embodiment of the present invention.

As shown in FIGS. 4 and 5, the master side clamp portion 23 has a grommet 25 mounted thereon and interposed between the master hose 12 and the master side clamp portion 23, the grommet constituting a retaining member for retaining the master hose 12. The grommet 25 is formed in a cylindrical shape to cover the outer peripheral surface of the master hose 12. Between the grommet 25 and the master hose 12 is formed a predetermined clearance. Here, this clearance may not be formed between the grommet 25 and the master hose 12 according the present embodiment.

The grommet 25 is made of a resilient material such as, for example, chloroprene rubber (CR), Chlorosulfonated polyethylene rubber (CSM) and the like. This means that the grommet 25 is adapted to resiliently support the master hose 12.

The grommet 25 has a predetermined spring constant "k" and a predetermined attenuation coefficient (also known as grommet hysteresis) "h". The spring constant "k" and the predetermined attenuation coefficient "h" are set to have respective optimum values by the relational equation of the Coriolis coercive force "$f_c$" (t) and the clamp reaction force "$f_r$" (t). The grommet 25 may be constructed by plastic materials other than the rubber-like resilient materials.

While the present embodiment has been explained with the first support member 21 and the second support member 22 being made of metal materials, the materials of the first support member 21 and the second support member 22 are not limited to these materials but may be made of a polyamide resin material such as, for example, PA11 PA12 and the like.

Figure 6:
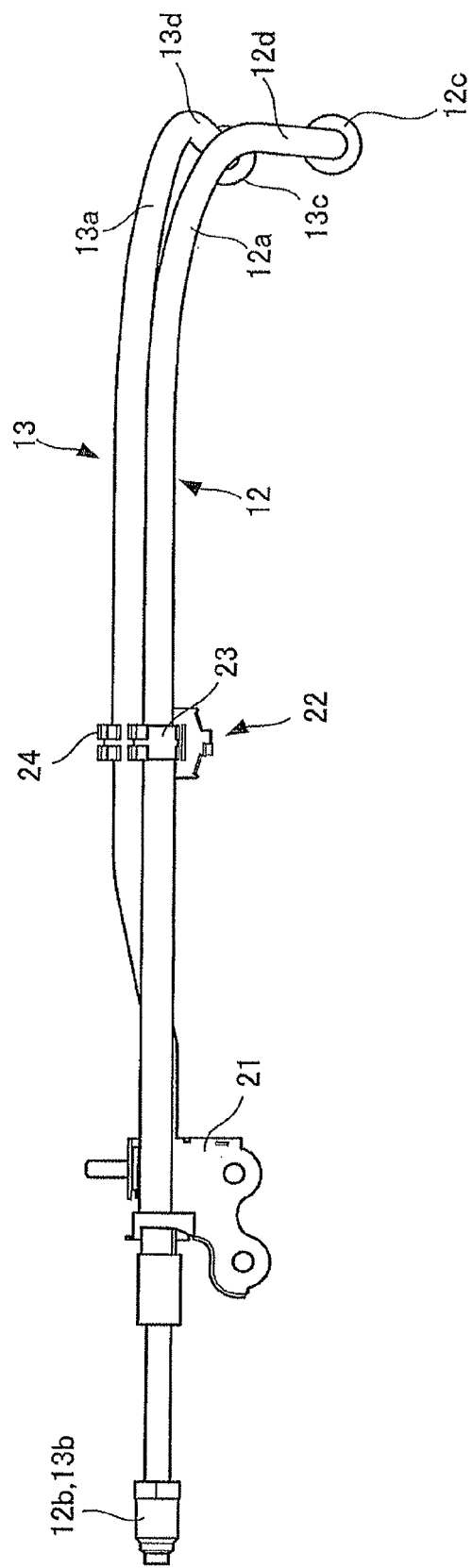
FIG. 6 is a side perspective view showing the pipe support structure according to the embodiment of the present invention.

As shown in FIG. 6, the master hose 12 and the return hose 13 have inclined portions 12d, 13d, respectively, between the bent portions 12a, 13a and the HPU side secured end portions 12c, 13c. The inclined portions are inclined with respect to a horizontal plane perpendicular to the gravity direction. More specifically, the inclined portions 12d, 13d are gradually upwardly inclined toward the bent portions 12a, 13a from the HPU side secured end portions 12c, 13c. The inclination angle of the inclined portion 12d is set to be larger than the inclination angle of the inclined portion 13d.

Figure 7:
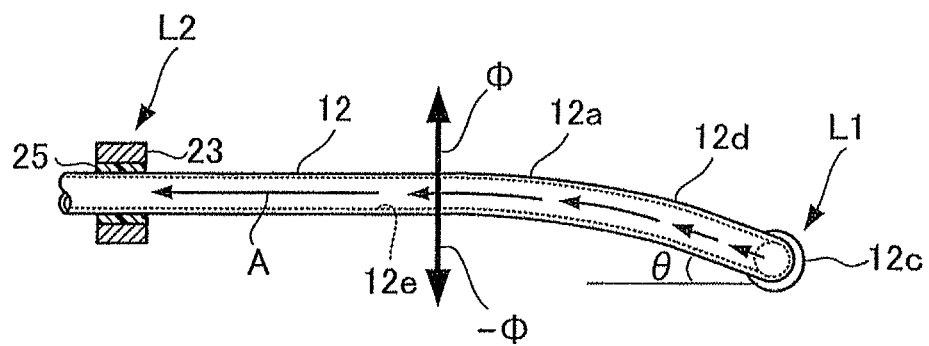
FIG. 7 is a side view showing the master hose forming part of the embodiment of the present invention.
Figure 8:
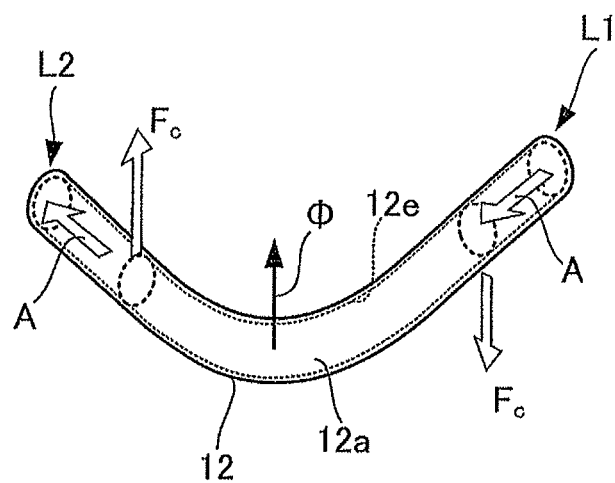
FIG. 8 is a fragmentary perspective view showing the master hose forming part of the embodiment of the present invention for explaining a Coriolis force caused on the master hose.
Figure 9:
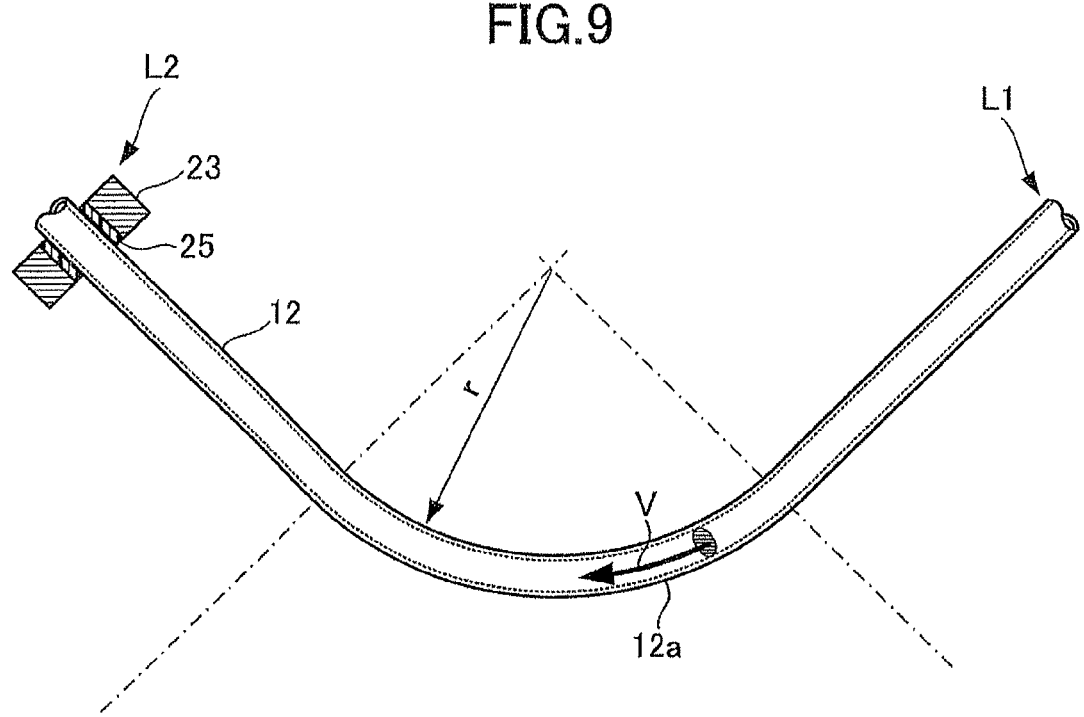
FIG. 9 is a fragmentary plan view schematically showing the master hose forming part of the embodiment of the present invention.

The following explanation will be directed to the Coriolis force $F_c$ (N) of the master hose 12 while raising the master hose 12 as an example with reference to FIGS. 7 to 9. The elements and parts constituting the master hose 12 and the second support member 22 are schematically shown in FIGS. 7 to 9.

Further, the following description will be made with the HPU side secured end portion secured to the HPU 11 being assumed to be a clamp position L1 while the master side clamp portion 23 (see FIG. 3) of the second support member 22 being assumed to be a clamp position L2. This means that the master hose 12 is supported at the first and second clamp positions L1, L2 on the HPU 11 and the second support member 22. The above bent portions 12a and the inclined portion 12d are disposed between the clamp position L1 and the clamp position L2. Here, the above the first and second clamp positions L1, L2 in the present embodiment constitute a first clamp position and a second clamp position, respectively, defined in the present invention.

As shown in FIG. 7, the working oil firstly passes through the fluid passage 12e in the master hose 12 from the HPU 11 (see FIG. 2) toward the GSA 10 (direction shown by arrows A in FIG. 7). At this time, the working oil passing through the fluid passage 12e in the master hose 12 collides with the inner wall of the inclined portion 12d of the master hose 12, resulting from the fact that the inclined portion 12d downstream of the bent portion 12a is upwardly inclined at a predetermined inclination angle θ. The collision of the working oil with the inclination portion 12d causes an upward-downward impulsive force in the master hose 12. The impulsive force acting in the upward and downward directions of the master hose 12 resiliently deform the master hose 12 in any one of the upward and downward directions. For this reason, the impulsive force previously mentioned and the restorative force to be caused from the resilient deformation causes a single vibration at an angular frequency ω(rad/s) in the upward and downward directions (directions Φ and −Φ in FIG. 7) of the master hose 12.

As shown in FIG. 8, when the fluid passage 12e in the master hose 12 having the single vibration caused therein as mentioned in the above is supplied with the working oil flowing in the direction shown by the arrows A in FIG. 8 in addition to the working oil previously mentioned, the master hose 12 is subjected to what is called a Coriolis force $F_c$ (N).

More specifically, when the master hose 12 is vibrated in the direction Φ, the master hose 12 upstream of the bent portion 12a is subjected to the collision force caused by the working oil flowing at the lower portion of the master hose 12, thereby causing the Coriolis force $F_c$ (N) downwardly directed as shown by an arrow $F_c$ in FIG. 8. On the other hand, the master hose 12 downstream of the bent portion 12a is subjected to the collision force caused by the working oil flowing at the upper portion of the master hose 12, thereby causing the Coriolis force $F_c$ (N) upwardly directed as shown by an arrow $F_c$ in FIG. 8.

In contrast, for example when the working oil flows in the direction opposite to the flow direction of the working oil mentioned in the above, viz., when the working oil flows in the return hose 13 in the direction from the GSA 10 (see FIG. 2) toward the HPU 11 with the return hose 13 being vibrated in the vibration direction Φ, the Coriolis force $F_c$ (N) downwardly directed, viz., in the direction opposite to the Coriolis force $F_c$ (N) previously mentioned for the master hose 12 in FIG. 8.

Here, the above Coriolis force $F_c$ (N) can be given by the following equation (9) when the fluid mass flowing between the clamp position L1 and the clamp position L2 is represented by "m"(g), the fluid angular speed (corresponding to the angular frequency ω of the single vibration) is represented by ω(rad/s), and the fluid speed of the working oil in the hose is represented by V(m/s).

$$F_c = 2m\omega V \quad (9)$$

As shown in FIG. 9, when the radius curvature of the bent portion 12a of the master hose 12 is represented by "r"(m), the fluid density is represented by ρ(g/m³), and the fluid amount, i.e., the volume of the working oil flowing between the clamp position L1 and the clamp position L2 is represented by v(m³), the fluid angular speed ω and the fluid mass "m" in the above equation (9) are given by the following equations (10) and (11).

$$\omega = \frac{V}{r} \quad (10)$$

$$m = \rho \cdot v \quad (11)$$

Here, the radius of curvature "r"(m) of the bent portion 12a shown in FIG. 9 is indicative of an arbitrary radius of curvature at the intersection of a long axis indicative of a long axis defined in a general ellipse equation, and an ellipse including the bent portion 12a. In other words, the length of the long axis (major axis) 2a in the general ellipse equation $x^2/a^2+y^2/b^2=1$ is equally divided to obtain a distance, i.e., "a" which is indicative of the radius of curvature "r" (m) of the bent portion 12a.

In the present embodiment, it has been described that the bent portion 12a has a shape partly formed by the ellipse, however, the shape of the bent portion 12a is not limited to the above shape. The bent portion 12a may have a shape partly formed by a circle (not ellipse) having a single radius of curvature. In this case, the radius of curvature "r" (m) of the bent portion 12a is indicative of a radius of curvature of a circle (not ellipse) having a single radius of curvature.

Further, the master hose 12 is vibrated at an angular vibration speed ω, so that the Coriolis force $f_c(t)$ per unit time can be given by the following equation (12).

$$f_c(t) = F_c \sin \omega t \quad (12)$$

Therefore, the Coriolis force $f_c(t)$ per time comes to be a sinusoidal excitation force vibrating at an amplitude Fc and an angular frequency □, i.e., an coercive external force at the first and second clamp positions L1, L2. In the following explanation, the Coriolis force $f_c(t)$ per unit time is referred to as a Coriolis coercive force $f_c(t)$.

On the other hand, the grommet 25 of the master side clamp portion 23 has a predetermined spring constant "k" and a predetermined attenuation coefficient "h", so that the master hose 12 especially at the clamp portion L2 is applied with the vibration model of the attenuation coercive vibration.

Here, the equation of motion indicative of the vibration model of the attenuation coercive vibration with the Coriolis coercive force $f_c(t)$ being the coercive external force is generally represented by the following equation (13).

$$M\ddot{x} + h\dot{x} + kx = f_c(t) \quad (13)$$

In the above equation (13), "M" is indicative of a total mass (g) of the fluid mass "m"(g) of the working oil flowing between the clamp position L1 to the clamp position L2 and the hose mass (g) of the master hose 12 between the clamp position L1 and the clamp position L2.

If the above equation (13) is then divided by "M", the following equation (14) can be given.

$$\ddot{x} + 2\zeta\omega_n\dot{x} + \omega_n^2 x = (F_c/M)\cdot\sin \omega t \quad (14)$$

In the above equation (14), "ω" and "ξ" is defined in the equations (20) and (21) stated hereinafter.

The solution x(t) in the above equation (14) is the sum of a general solution of free vibration with the right-hand side in the above equation being plated "0" and the particular solution $x_p(t)$ of the force constant with respect to the coercive external force, and can be given by the following equation (15).

$$x(t) = e^{-\zeta\omega_n t}(A \sin\sqrt{1-\zeta^2}\omega_n t + B \cos\sqrt{1-\zeta^2}\omega_n t + x_p(t) \quad (15)$$

In the above equation (15), the first item of the right-hand side is indicative of the free vibration damped vibration, while the second item of the right-hand side is indicative of the forced harmonic vibrations of the coercive vibration. The solution x(t) is a waveform transient vibration combined with the free vibration and the coercive vibration.

Here, in the above solution x(t), when a predetermined time elapses, the free vibration is eventually attenuated, thereby remaining the steady-state vibration represented by the particular solution $x_p(t)$ indicative of the steady-state vibration. In this case, the particular solution $x_p(t)$ is the harmonic response of the frequency the same as the frequency of the coercive external force.

Therefore, the particular solution $x_p(t)$ of the steady-state vibration can be given by the following equation (16).

$$x_p(t) = X \sin(\omega t - \phi) \quad (16)$$

Here, the Coriolis coercive force $f_c(t)$ in the above equation (13) is equivalent to the sinusoidal excitation force as clear from the above equation (12), so that the grommet 25 of the master side clamp portion subjected to the sinusoidal excitation force comes to respond at a frequency the same as that of the sinusoidal excitation force. More specifically, if the solution $x_p(t)$ in the above equation (16) is replaced by the reaction force from the grommet 25 temporally varying in response to the Coriolis coercive force $f_c(t)$, viz., the clamp reaction force "fr" ($t$) per unit time, and "X" showing the amplitude in the above equation is replaced by the amplitude $F_c$ of the clamp reaction force "fr" ($t$), the above equation (16) can be replaced by the following equation (17). Here, the above amplitude $F_r$ is indicative of an amplitude of the reaction force $F_r(N)$ against the Coriolis force $F_c(N)$.

$$f_r(t)=F_r \sin(\omega t-\phi) \tag{17}$$

At this time, the amplitude $F_r$ and the phase difference $\phi$ of the clamp reaction force "$f_r$"(t) in the above equation (17) can be given by the following equations (18) and (19), respectively.

$$F_r = \frac{F_c/k}{\sqrt{\left\{1-\left(\frac{\omega}{\omega_n}\right)^2\right\}^2+\left(2\zeta\frac{\omega}{\omega_n}\right)^2}} \tag{18}$$

$$\phi = \tan^{-1}\left\{\frac{2\zeta\frac{\omega}{\omega_n}}{1-\left(\frac{\omega}{\omega_n}\right)^2}\right\} \tag{19}$$

Here, the symbol $\omega_n$ in the above equations (18) and (19) is indicative of an inherent angular frequency of the grommet 25 as represented by the following equation (20). The symbol $\zeta$ is indicative of a damping ratio as represented by following equation (21).

$$\omega_n = \sqrt{\frac{k}{M}} \tag{20}$$

$$\zeta = \frac{h}{2\sqrt{Mk}} \tag{21}$$

Here, the symbol $\omega/\omega_n$ in the above equations (20) and (21) is indicative of the ratio of the amplitude of the coercive Coriolis force $f_c(t)$, i.e., the angular frequency $\omega$ of the Coriolis force $F_c$ to the inherent angular frequency $w_n$. When the ratio is 1, viz., $\omega/\omega_n=1$, there is caused a resonance phenomenon.

When the ratio is for example near the resonance point $\omega \cong \omega_n$ ($\omega/\omega_n \cong 1$), the amplitude $F_r$ of the clamp reaction force "$f_r$"(t) in the above equation (18) can approximately be given by the following equation (22).

$$F_r = \frac{F_c/k}{2\zeta} = \frac{F_c}{h\omega_n} \tag{22}$$

The magnitude of the clamp reaction force "$f_r$"(t) is, as given by the above equation (22) near the resonance point is decided by the above attenuation coefficient "h". For example with twice the attenuation coefficient "h", the peak amplitude $F_r$ is ½, whereas 0.5 times the attenuation coefficient "h", the peak amplitude is twice. It will therefore be appreciated that the attenuation coefficient "h" adjusted in the area near the resonance point makes it possible to adjust the magnitude of the clamp reaction force "$f_r$"(t), i.e., the amplitude $F_r$ in the area near the resonance point.

On the other hand, in the area ($\omega \ll \omega_n$), in which the angular frequency $\omega$ of the Coriolis force $F_c$ is small as compared with the inherent angular frequency $\omega_n$ of the grommet 25, the amplitude $F_r$ of the clamp reaction force "$f_r$"(t) in the above equation (10) can approximately be given by the following equation (23).

$$F_r = \frac{F_c/k}{\sqrt{1+0}} = \frac{F_c}{k} \tag{23}$$

As is represented by the above equation (23), the magnitude of the clamp reaction force fr(t) is decided by the above spring constant "k" in the area ($\omega \ll \omega_n$), in which the angular frequency $\omega$ of the Coriolis force $F_c$ is small as compared with the inherent angular frequency $\omega_n$ of the grommet 25. This means that in the area ($\omega \ll \omega_n$), the above spring constant "k" adjusted makes it possible to adjust the amplitude $F_r$ of the clamp reaction force "$f_r$"(t).

In the meantime, the resin hose allowing the working oil at a high temperature to flow therein is generally expanded in response to the raised temperature of the working oil when the temperature of the working oil flowing in the resin hose is increased. This means that the expansion amount of the resin hose, so called "hose compliance amount" is increased. The increased hose compliance amount is apt to cause disadvantageous effects such as deterioration of the responsive property of the hydraulic device and other problems.

In view of these disadvantageous effects, the present embodiment is constructed to have the clamp reaction force $f_r(t)$, applied to the master hose 12 from the grommet 25 in response to the coercive Coriolis force $f_c(t)$ caused on the master hose 12, become a load to be imparted to the master hose 12, so that the master hose 12 can be suppressed from being expanded when the working oil at a high temperature passes through the master hose 12.

Figure 15:
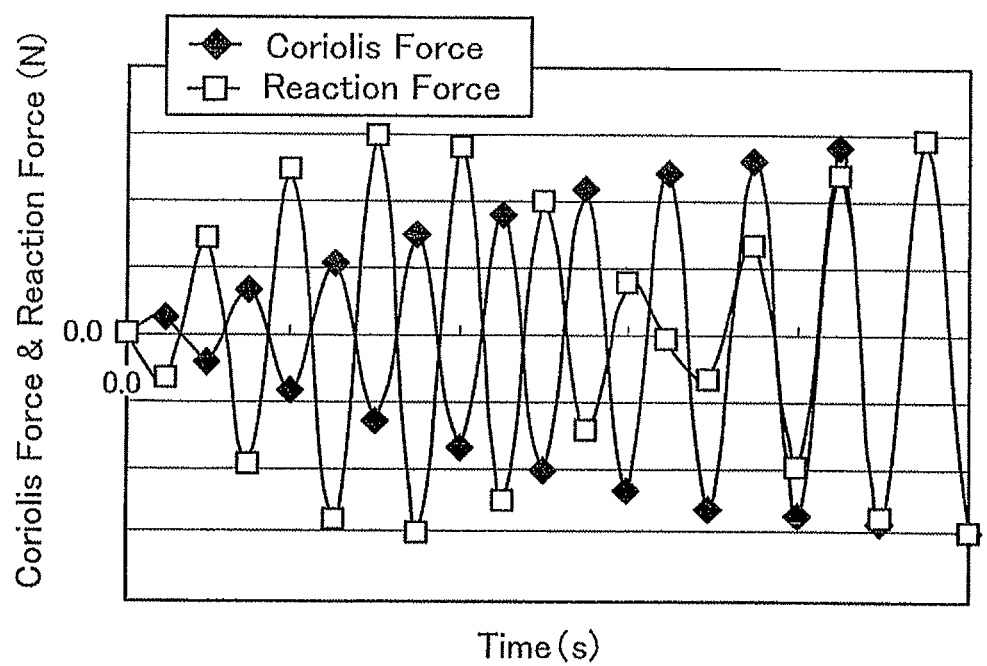
FIG. 15 is a graph showing the relationship between the Coriolis coercive force and the clamp reaction force caused on the conventional pipe support structure.

Here, the clamp reaction force fr(t) can be imparted to the master hose 12, however, is difficult to supply the hydraulic pressure in a stable state to the GSA 10 or HPU 11 in the case that the magnitude of the coercive Coriolis force $f_c(t)$ caused on the master hose 12 is not equal to the magnitude of the clamp reaction force $f_r(t)$ applied to the master hose 12 due to both of the above forces fluctuated as in the conventional apparatus (see FIG. 15).

Figure 10:
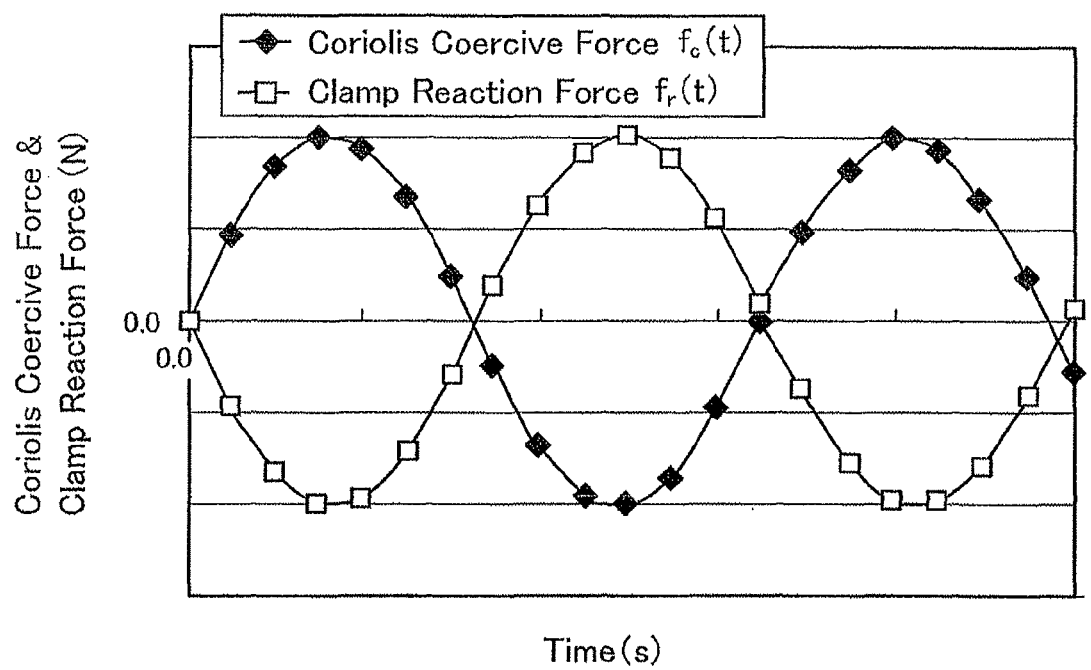
FIG. 10 is a graph showing the relationship between a Coriolis coercive force and a clamp reaction force caused on the pipe support structure according to the embodiment of the present invention.

For this reason, the present embodiment is constructed as shown in FIG. 10 to have the coercive Coriolis force $f_c(t)$ caused on the master hose 12 and the clamp reaction force $f_r(t)$ applied to the master hose 12 matched in phase and cancelled with each other. This means that the coercive Coriolis force $f_c(t)$ and the clamp reaction force $f_r(t)$ are adjusted with each other as seen from the value "k" approaching "1" in the following equation (24).

$$f_c(t)=-kf_r(t) \tag{24}$$

Here, the above symbol "k" is indicative of a coefficient, viz., a reaction rate of recovery to the Coriolis force $F_c(N)$ which is decided by the ratio of the clamp reaction force $f_r(t)$ and the coercive Coriolis force $f_c(t)$. The fact that the value "k" approaches "1" in the above equation (24) means the fact that the magnitudes of the clamp reaction force $f_r(t)$ and the coercive Coriolis force $f_c(t)$ come to approximately be equal to each other. This means that the coercive Coriolis force $f_c(t)$ and the clamp reaction force $f_r(t)$ work together to cancel each other.

In order that the above relational equation (24) is established and that the coercive Coriolis force $f_c(t)$ and the clamp reaction force $f_r(t)$ are matched in phase with each other as shown in FIG. 10, the present embodiment is constructed to have the coercive Coriolis force $f_c(t)$ and the clamp reaction force $f_r(t)$ adjusted to have optimum values, respectively.

The methods of adjusting coercive Coriolis force $f_c(t)$ and the clamp reaction force $f_r(t)$ are as follows.

As previously mentioned, the Coriolis force $F_c$ (N) can be given by the above equation (9), and the magnitude of the Coriolis force $F_c$ (N) can be adjusted if the value of the fluid mass "m"(g) in the above equation (9) is varied. More specifically, the fluid mass "m"(g) can be decided by the above equation (11), viz., by the fluid density $\rho(g/m^3)$ and the fluid volume $(m^3)$. For this reason, the adjustments of the first and second clamp positions L1, L2 make it possible to adjust the above fluid mass "m"(g). This means that the adjustment of the above fluid mass "m"(g) makes it possible to adjust the Coriolis force $F_c$(N). The fact that the Coriolis force $F_c$(N) is adjusted leads to the fact that the amplitude of the coercive Coriolis force $f_c(t)$ serving as a coercive external force in the motion equation of the forced vibration damping represented by the above equation (13) is adjusted.

The present embodiment is constructed to have the first and second clamp positions L1, L2 adjusted and to have the first and second clamp positions L1, L2 respectively disposed at the positions where the amplitude of the Coriolis force $F_c$(N), i.e., the coercive Coriolis force $f_c(t)$ has a maximum value. This makes it possible to have the Coriolis force $F_c$(N) take a maximum value.

The angular frequency $\omega$ of the coercive Coriolis force $f_c(t)$ is, as represented by the above equation (10), dependent on and thus decided by the flow speed V(m/s) of the working oil in the master hose 12 or the radius of curvature "r"(m) of the bent portion 12a of the master hose 12. Therefore, the adjustment of the radius of curvature "r"(m) of the bent portion 12a of the master hose 12 in the present embodiment makes it possible to adjust the angular frequency $\omega$ of the coercive Coriolis force $f_c(t)$.

From the foregoing description, it will be understood that, in the present embodiment, the adjustments of the first and second clamp positions L1, L2 and the radius of curvature "r"(m) of the bent portion 12a of the master hose 12 makes it possible to adjust the coercive Coriolis force $f_c(t)$.

On the other hand, the clamp reaction force $f_r(t)$ represented by the above equation (17) has a predetermined phase difference $\phi$ obtained by the above equation (19). For this reason, it is preferable that the above phase difference be as small as possible in order to have the coercive Coriolis force $f_c(t)$ and the clamp reaction force $f_r(t)$ equal to each other as shown in FIG. 10.

More specifically, at least one of the damping ratio $\zeta$ and the inherent angular frequency $\omega_n$ of the grommet 25 in the above equation (19) is adjusted. The adjustment of the damping ratio $\zeta$ and the inherent angular frequency $\omega_n$ is performed by selecting both of or any one of the spring constant "k" of the grommet 25 and the attenuation coefficient "h". This means that the grommet 25 having the optimum spring constant "k" and the attenuation coefficient "h" is required to be suitably selected for making the above phase difference $\phi$ as small as possible.

In contrast, the amplitude $F_r$ of the clamp reaction force "$f_r$"(t) is indicated by the above equation (18), and the spring constant "k" and the attenuation coefficient "h" are decided to have respective magnitudes by selecting the grommet 25 for the adjustment of the above phase difference $\phi$. At this time, the amplitude $F_r$ of the clamp reaction force "$f_r$"(t) is dependent on the amplitude $F_c$ of the Coriolis coercive force $f_c(t)$ as represented by the above equation (18), so that the amplitude $F_r$ of the clamp reaction force "$f_r$"(t) and the amplitude $F_c$ of the Coriolis coercive force $f_c$ (t) are preferably approximated to each other ($F_r \cong F_c$)

The adjustment of the amplitude $F_r$ of the clamp reaction force "$f_r$"(t) is performed in such a manner that the spring constant "k" and the attenuation coefficient "h" are adjusted to make the amplitude $F_r$ have an maximum value in the range of the allowed phase difference $\phi$.

Further, the amplitude $F_r$ of the clamp reaction force "$f_r$"(t) may be decided by adjusting the spring constant "k" and the attenuation coefficient "h" as represented by the above equations (22) and (23) in consideration of the cases of the near resonance points $\omega \cong \omega_n (\omega/\omega_n \cong 1)$ and $\omega \ll w_n$ as previously mentioned.

It will therefore be understood that the clamp reaction force "$f_r$"(t) can be adjusted by adjusting the spring constant "k" and the attenuation coefficient "h" in the present embodiment.

Therefore, the first and second clamp positions L1, L2, the radius of curvature "r" (m) of the bent portion 12a of the master hose 12, and the spring constant "k" and the attenuation coefficient "h" of the grommet 25 are suitably adjusted to have the Coriolis coercive force $f_c$ (t) and the clamp reaction force "$f_r$"(t) become in relationship to cancel each other as shown in FIG. 10 in the present embodiment. This makes it possible for the clamp reaction force "$f_r$"(t) to suppress the expansion amount of the master hose 12.

Here, the following explanation will hereinafter be made about the hose compliance amount of the master hose 12 while comparing the pipe support structure according to the present embodiment with the conventional pipe support structure with reference to FIGS. 11 and 12.

Figure 11:
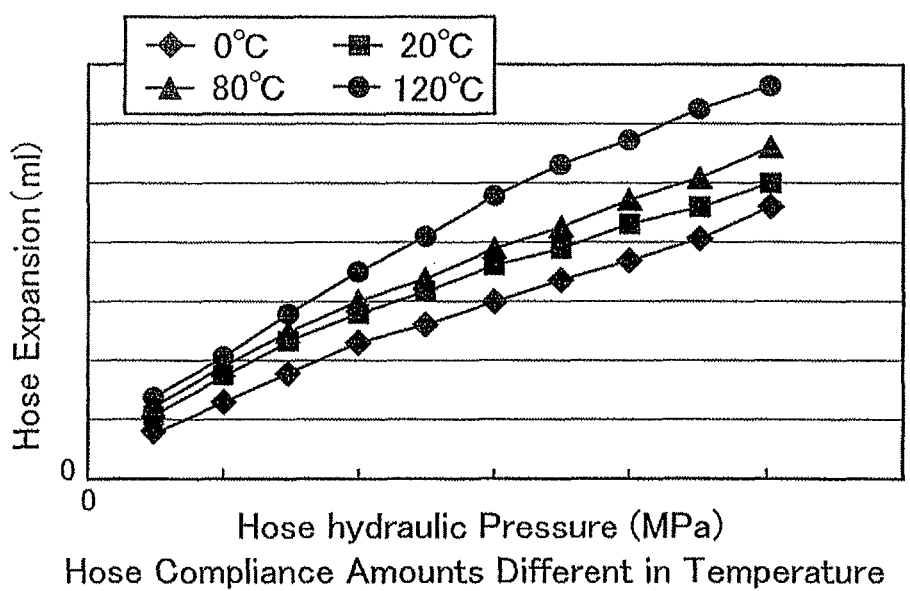
FIG. 11 is a graph showing hose compliance amounts varied at different temperatures in the conventional pipe support structure.

The hose compliance amounts at the different temperatures shown in FIG. 11 are indicated when applied to the conventional pipe support structure. The horizontal and vertical axes respectively indicate a hose hydraulic pressure (MPa) and a hose expansion amount (ml) in FIG. 11. The conventional pipe support structure has the clamp position of the master hose, the curvature of the bent portion of the master hose, and the attenuation coefficient "h" and the spring constant "k" of the grommet which are not optimized.

In contrast, the hose compliance amounts at the different temperatures shown in FIG. 11 are indicated when applied to the pipe support structure according to the present embodiment. The first and second clamp positions L1, L2, the radius of curvature "r" (m) of the bent portion 12a of the master hose 12, and the spring constant "k" and the attenuation coefficient "h" of the grommet 25 are suitably adjusted to have the Coriolis coercive force $f_c$ (t) and the clamp reaction force "$f_r$"(t) become optimized in relationship to cancel each other as shown in FIG. 10 in the present embodiment.

Figure 12:
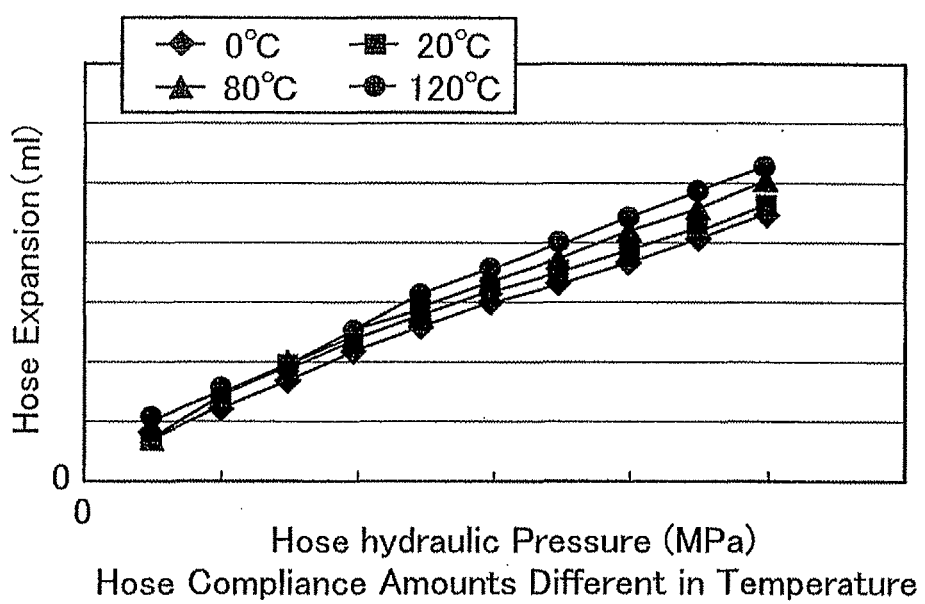
FIG. 12 is a graph showing hose compliance amounts varied at different temperatures in the pipe support structure according to the embodiment of the present invention.
Figure 13:
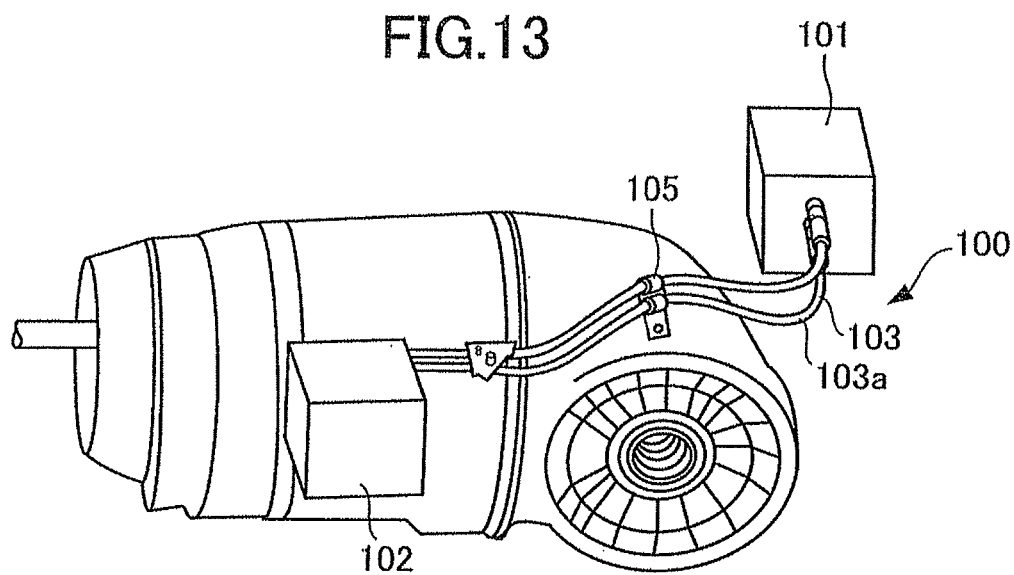
FIG. 13 is a perspective view schematically showing the conventional pipe support structure.
Figure 14:
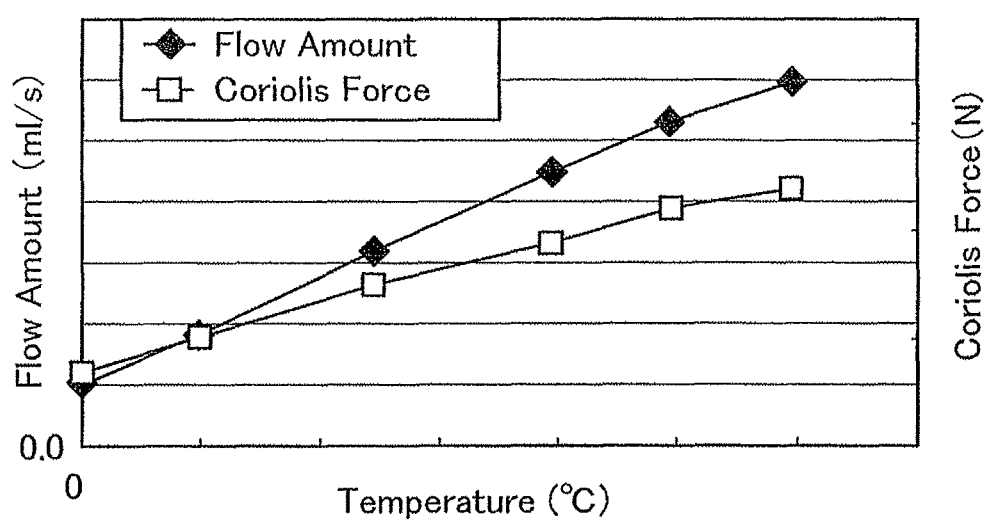
FIG. 14 is a graph showing the relationship between the amount of working oil and the Coriolis force with the temperature of the working oil being a parameter.

As shown in FIGS. 11 and 12, the example to which the pipe support structure according to the present embodiment is applied has hose expansion amounts (ml) at the temperatures of the working oil of 20° C., 80° C. and 120° C. which are converged to the hose expansion amount (ml) at the temperature of 0° C. as compared with the conventional pipe support structure. Especially when the temperature of the working oil is 120, ° C. the hose expansion amount in the pipe support structure according to the present embodiment can be suppressed to about 1.1 times the hose expansion amount at the maximum as compared with about 1.5 times the hose expansion amount at the maximum in the conventional pipe support structure. As will be understood from the above results, the pipe support structure according to the present embodiment can suppress the hose expansion amount of the master hose 12 from being increased even at the time of the temperature of the working oil being raised.

As will be understood from the foregoing description, the pipe support structure according to the present embodiment is constructed to have at least any one of the first and second clamp positions L1, L2 and the radius of curvature "r"(m) of the bent portion 12a of the master hose 12 set and to have the spring constant "k" and the attenuation coefficient "h" of the grommet 25 set for the purpose of suppressing the hose expansion amount of the master hose 12 from being increased by the reaction force $F_r$(N), i.e., the amplitude of the clamp reaction force "$f_r$"(t) caused on the grommet 25 in response to the Coriolis force $F_c$ (N), i.e., the amplitude of the Coriolis coercive force $f_c$ (t) caused on the master force 12 when the working oil at a high temperature flows in the fluid passage 12e.

For this reason, the pipe support structure according to the present embodiment can utilize the Coriolis coercive force $f_c$ (t) caused on the master force 12 and the clamp reaction force "$f_r$"(t) caused on the grommet 25. This makes it possible for the pipe support structure according to the present embodiment to suppress the hose compliance amount in the high temperature area, viz., the expansion amount of the master hose 12 from being increased while maintaining the mountability of the degree of freedom especially for the master hose made of a resilient material such as for example resins and the like. The pipe support structure according to the present embodiment can be realized with the construction simple and at a lost cost.

Further, the pipe support structure according to the present embodiment is constructed to have the first and second clamp positions L1, L2, the radius of curvature "r"(m) of the bent portion 12a of the master hose 12, and the spring constant "k" and the attenuation coefficient "h" of the grommet 25 set to approximate the coefficient "k" in the above equation (24) to "1". For this reason, the Coriolis coercive force $f_c$ (t) and the clamp reaction force "$f_r$"(t) act to cancel each other, so that the clamp reaction force "$f_r$"(t) can be converted to the pressing load to the master hose 12, thereby making it possible to suppress the expansion amount of the master hose 12 from being increased.

The pipe support structure according to the present embodiment is constructed to have the position of at least any one of the first and second clamp positions L1, L2 adjusted, thereby adjusting fluid mass "m" (g) represented by the above equation (11). This makes it possible to adjust the Coriolis force $F_c$ (N), i.e., the amplitude of the Coriolis coercive force $f_c$ (t) caused on the master force 12. Further, the pipe support structure according to the present embodiment can adjust fluid angular speed ω(rad/s) represented by the above equation (10) by adjusting the radius of curvature "r"(m) of the bent portion 12a.

The pipe support structure according to the present embodiment can adjust the Coriolis coercive force $f_c$ (t) only by adjusting the first and second clamp positions L1, L2 and the radius of curvature "r"(m) of the bent portion 12a.

Further, the pipe support structure according to the present embodiment can adjust the phase difference φ and the reaction force $F_r$(N) by adjusting the spring constant "k" and the attenuation coefficient "h" of the grommet 25. For this reason, the pipe support structure according to the present embodiment can adjust the clamp reaction force "$f_r$"(t) in response to the Coriolis coercive force $f_c$ (t) only by suitably selecting the optimum spring constant "k" and the optimum attenuation coefficient "h" from among the grommets 25 respectively having the spring constants "k" and the attenuation coefficients "h" different from one another.

Although the above present embodiment has been explained about the support structure of the master hose 12, the support structure the same as the support structure of the master hose 12 can be applied to the return hose 13.

While the explanations have been made about the present embodiments, raising the examples in which the pipe support structure according to the present invention is applied to the master hose 12 and the return hose 13 both serving as connecting the GSA 10 and the HPU 11, the pipe support structure according to the present invention is not limited to these examples, but may be applied to any type of pipe if the pipe is made of resin allowing the fluid such as the working oil at a high temperature to pass therethrough and has a shape to cause the Coriolis force. The pipe support structure according to the present invention can suitably be applied in particular to the pipe which uses working oil as a fluid and is subjected to heat expansion which is apt to affect the hydraulic control.

Further, the present embodiment is constructed in such a manner that the first and second clamp positions L1, L2, the radius of curvature "r" (m) of the bent portion 12a of the master hose 12, and the spring constant "k" and the attenuation coefficient "h" of the grommet 25 are suitably adjusted to have the Coriolis coercive force $f_c$ (t) and the clamp reaction force "$f_r$"(t) become optimized in relationship to cancel each other. The present invention is not limited to the above present embodiment but may include such a construction that at least any one of the first and second clamp positions L1, L2, the radius of curvature "r" (m) of the bent portion 12a of the master hose 12, and the spring constant "k" and the attenuation coefficient "h" of the grommet 25 is suitably adjusted to have the Coriolis coercive force $f_c$ (t) and the clamp reaction force "$f_r$"(t) become optimized in relationship to cancel each other. For example, the present invention may include such a construction that the first and second clamp positions L1, L2, and the radius of curvature "r" (m) are adjusted with the spring constant "k" and the attenuation coefficient "h" of the grommet 25 being not adjusted, or otherwise the spring constant "k" and the attenuation coefficient "h" of the grommet 25 are adjusted with the first and second clamp positions L1, L2, and the radius of curvature "r" (m) being not adjusted.

Further, the Coriolis force $F_c$(N) utilized in the present embodiment is dependent on the flow speed V(m/s) of the working oil in the hose, so that the Coriolis force $F_c$(N) and the coercive Coriolis force $f_c$(t) thus caused may be adjusted by controlling the flow speed V(m/s) of the working oil in the hose.

As has been explained in the above description, the pipe support structure according to the present invention is constructed to utilize the Coriolis force and the reaction force thus caused, thereby making it possible to suppress the hose compliance amount in the high temperature area while maintaining the degree of freedom of mountability specific for the resin pipe and to realize the above suppressing effect by the simple construction and at a low cost. In addition of the above advantageous effect, the pipe support structure according to the present invention is useful for almost all of pipe support structures which allow the fluid at a high temperature to pass therethrough.

EXPLANATION OF REFERENCE NUMERALS

12: master hose
12a, 13a: bent portion
12c, 13c: HPU side secured end portion
12d, 13d: inclined portion 12e: fluid passage
13: return hose
22: second support member
23: master side clamp portion
24: return side clamp portion
25: grommet
L1: clamp position
L2: clamp position

The invention claimed is:

1. A method for assembling a pipe support structure for supporting a pipe supported at a first clamp position and a second clamp position, the pipe having a fluid passage formed therein to allow a fluid at a high temperature to pass therethrough, and made of a resilient material, the pipe support structure including a retaining member for resiliently retaining the outer peripheral portion at, at least one of the first clamp position and the second clamp position, the pipe having an inclined portion inclined with respect to a horizontal plane perpendicular to the gravity direction, and a bent portion having a predetermined radius of curvature, the inclined portion and the bent portion being disposed between the first clamp position and the second clamp position, wherein the retaining member has a predetermined spring constant and a predetermined attenuation coefficient, the pipe is subjected to a Coriolis force and having a heat expansion amount caused by the Coriolis force when the fluid passage allows the fluid at the high temperature, and the retaining member having a reaction force acting against the Coriolis force, the method comprising:

providing the retaining member, which is set to have such the spring constant and such the attenuation coefficient, at such a position of at least one of the first clamp position and the second clamp position and providing the bent portion having such a shape such that the reaction force of the retaining member generated in response to the Coriolis force generated on the pipe acts to suppress the heat expansion amount caused by the Coriolis force from being increased when the fluid passage allows the fluid at the high temperature, wherein:

when the Coriolis force is represented by $F_c$, the fluid angular speed of the fluid passing through the fluid passage is represented by $\omega$, and the time is represented by t, the Coriolis coercive force $f_c$ temporally varying in response to the vibration of the pipe is given by $f_c(t) = F_c \sin \omega t$, when the reaction force caused on the retaining member against the Coriolis force $F_c$ is represented by $F_r$, and the clamp reaction force caused on the retaining member and temporally varying in response to the Coriolis coercive force $f_c(t)$ is represented by $f_r(t)$, the clamp reaction force $f_r(t)$ is given by $f_r(t) = Fr \sin(\omega t - \phi)$, and when the coefficient to be determined in response to the ratio of the clamp reaction force $f_r(t)$ with respect to the Coriolis coercive force $f_c(t)$ is "k", the first clamp position, the second clamp position, the shape of the bent portion, the spring constant, and the attenuation coefficient are set to have the coefficient "k" in the following equation (1) approach the number of 1

$$f_c(t) = -k f_r(t) \tag{1}$$

2. The method as set forth in claim 1, in which when the fluid mass of the fluid passing through the fluid passage between the first clamp position and the second clamp position is represented by "m", and the fluid speed passing through the fluid passage is represented by "V", the Coriolis force is given by the following equation (2), $$F_c = 2m \omega V \tag{2}$$

when the fluid density of the fluid is represented by "ρ", the fluid speed passing through the fluid passage between the first clamp position and the second clamp position is represented by "v", and the radius of curvature of the bent portion is represented by "r", the fluid mass "m" and the fluid angular speed w in the above equation (2) are given by the following equations (3) and (4), respectively, $$m = \rho \cdot v \tag{3}$$

$$\omega = \frac{V}{r} \tag{4}$$

adjusting at least one of the first clamp position and the second clamp position, and adjusting the fluid mass "m" indicated in the above equation (3) to adjust the Coriolis force $F_c$ indicative of the amplitude of vibration in the above Coriolis coercive force $f_c(t)$, and adjusting the radius of curvature "r" of the bent portion to adjust the fluid anular speed ω.

3. The method as set forth in claim 1, in which when the inherent vibration number of the retaining member is represented by $\omega_n$, the damping ratio is represented by ζ, and the spring constant is represented by "k", the reaction force $F_r$ and the phase difference φ indicative of the amplitude in the clamp reaction force $f_r(t)$ are given by the following equations (5) and (6), $$F_r = \frac{F_c/k}{\sqrt{\left\{1 - \left(\frac{\omega}{\omega_n}\right)^2\right\}^2 + \left(2\zeta\frac{\omega}{\omega_n}\right)^2}} \tag{5}$$

$$\phi = \tan^{-1}\left\{\frac{2\zeta\frac{\omega}{\omega_n}}{1 - \left(\frac{\omega}{\omega_n}\right)^2}\right\} \tag{6}$$

when the attenuation coefficient is represented by "h", and a total mass totaling the fluid mass of the whole fluid passage and the mass of the pipe is represented by "M", the inherent angular vibration number $\omega_n$ and the damping ratio ζ in the above equations (5) and (6) are given by the following equations (7) and (8), respectively, $$\omega_n = \sqrt{\frac{k}{M}} \tag{7}$$

$$\zeta = \frac{h}{2\sqrt{Mk}} \tag{8}$$

adjusting the spring constant "k" and the attenuation coefficient "h" to adjust the phase difference φ and the reaction force $F_1$.

4. The method as set forth in claim 2, in which when the inherent vibration number of the retaining member is represented by $\omega_n$, the damping ratio is represented by ζ, and the spring constant is represented by "k", the reaction force $F_r$ and the phase difference φ indicative of the amplitude in the clamp reaction force $f_r(t)$ are given by the following equations (5) and (6), $$F_r = \frac{F_c/k}{\sqrt{\left\{1-\left(\frac{\omega}{\omega_n}\right)^2\right\}^2 + \left(2\zeta\frac{\omega}{\omega_n}\right)^2}} \quad (5)$$

$$\phi = \tan^{-1}\left\{\frac{2\zeta\frac{\omega}{\omega_n}}{1-\left(\frac{\omega}{\omega_n}\right)^2}\right\} \quad (6)$$

when the attenuation coefficient is represented by "h", and a total mass totaling the fluid mass of the whole fluid passage and the mass of the pipe is represented by "M", the inherent angular vibration number $\omega_n$ and the damping ratio $\zeta$ in the above equations (5) and (6) are given by the following equations (7) and (8), respectively, $$\omega_n = \sqrt{\frac{k}{M}} \quad (7)$$

$$\zeta = \frac{h}{2\sqrt{Mk}} \quad (8)$$

adjusting the spring constant "k" and the attenuation coefficient "h" to adjust the phase difference $\phi$ and the reaction force $F_1$.

* * * * *